No. 624,269. Patented May 2, 1899.
J. S. VOLTZ.
BICYCLE SADDLE SPRING.
(Application filed Nov. 28, 1898.)
(No Model.)
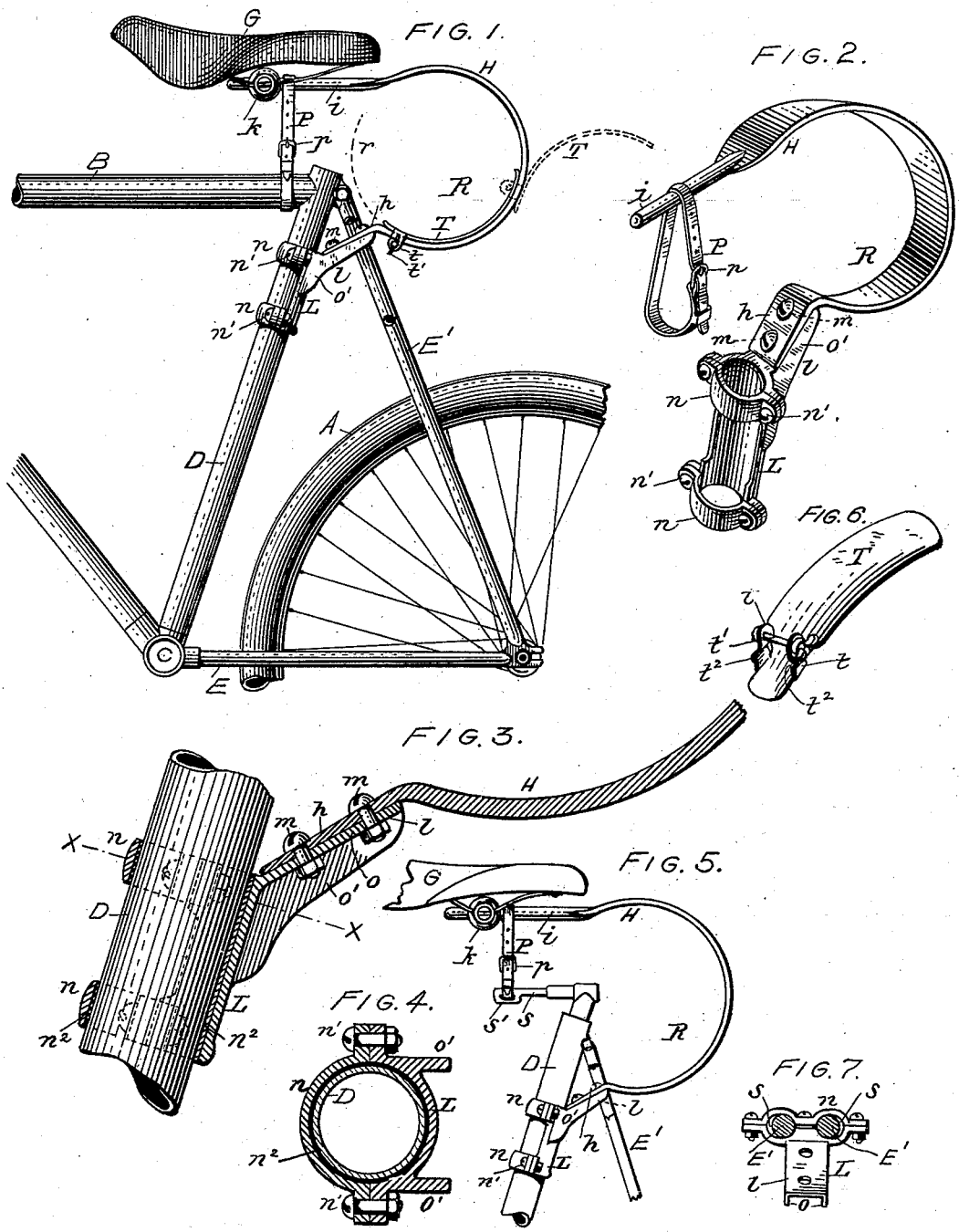

UNITED STATES PATENT OFFICE.

JOHN S. VOLTZ, OF BUFFALO, NEW YORK.

BICYCLE-SADDLE SPRING.

SPECIFICATION forming part of Letters Patent No. 624,269, dated May 2, 1899.

Application filed November 28, 1898. Serial No. 697,716. (No model.)

*To all whom it may concern:*

Be it known that I, JOHN S. VOLTZ, a citizen of the United States, residing at Buffalo, in the county of Erie and State of New York, have invented certain new and useful Improvements in Bicycle-Saddle Springs, of which the following is a full, clear, and exact description.

My invention relates to saddle-supporting springs for bicycles and other similar vehicles; and the object of my invention is to provide a saddle-spring capable of a maximum downward deflection and which is held against upward deflection or recoil above a normal position, whereby all short, jerky, and other injurious jars and vibrations are practically eliminated and the comfort and safety of the rider greatly enhanced; also, to provide a practical luggage-carrier and simple mudguard; and it consists, to that end, in the peculiar construction and arrangement of the parts, as will be hereinafter more fully set forth.

In the accompanying drawings, Figure 1 is a fragmentary side elevation of the upper rear portion of a bicycle provided with my improvements. Fig. 2 is a detached perspective view of the saddle-supporting spring and connecting parts. Fig. 3 is a fragmentary section of the clip or yoke, whereby the spring is attached to the bicycle-frame. Fig. 4 is a horizontal section thereof in line $x\,x$, Fig. 3. Fig. 5 is a fragmentary side elevation of a lady's bicycle provided with my improved saddle-spring. Fig. 6 is a perspective view of the mud-guard detached. Fig. 7 is a plan view of a slightly-modified form of the spring-supporting clip.

Like letters of reference refer to like parts in each of the figures.

A represents the rear wheel, B the upper horizontal tube, C the hanger, D the vertical tube, extending from the hanger C to the upper tube B, E E' the rear forks of the bicycle-frame, extending, respectively, from the hanger C and upper tube B to the axle of the rear wheel A, and G is the saddle, all of which parts are of ordinary and well-known construction.

H is the C-shaped saddle-spring, preferably formed of flat bar-steel and provided at its lower end with a tongue $h$ and terminating at its upper forward end in a bar or cylindrical saddle-stem $i$, to which the saddle G is adjustably secured by the clip $k$.

L is a semicylindrical yoke or clip embracing the rear side vertical tube D of the bicycle-frame and provided at its upper rear side with a rearwardly and upwardly projecting spur or bracket $l$, to which the tongue $h$ of the spring H is secured by bolts or rivets $m\,m$ or otherwise.

The yoke L is adjustably secured to the tube D by clips $n\,n$ and screw-bolts $n'\,n'$.

The yoke L and clips $n\,n$ are provided on their inner sides with a lining $n^2$ of felt, chamois, or other soft material to prevent marring or injury to the tube D.

The spur or bracket $l$ is composed of a web $o$ and side cheeks $o'\,o'$.

P is a strap supported on the saddle-stem $i$, preferably in rear of the saddle-clip $k$, and which surrounds the upper tube B, and is provided at its free end with a buckle $p$, whereby it can be shortened or lengthened to increase or diminish the tension of the saddle-spring H in accordance with the weight of the rider.

It is obvious that the tension of the spring can be materially increased or diminished by adjusting the saddle backward or forward on the saddle-stem $i$.

The strap P permits the free downward deflection of the spring H, but prevents its recoiling or upward deflection beyond the point of adjustment, and thereby serves to prevent the rider from losing the pedals by the reaction of the spring.

The saddle H can be raised or lowered to suit the reach of the rider by simply raising or lowering the yoke L and then securing same in position and tightening the bolts $n'\,n'$ of the clips $n\,n$.

My improved seat-spring dispenses with the usual seat-post, thereby permitting a considerable unobstructed range of deflection to the spring H, and consequently relieves the rider from undue jars in riding over rough roads and from the short vibrating and jerking jars or quivering when riding over stone-paved roads.

The loop portion R of the spring H serves as a convenient and practical luggage-carrier and the broad flat rear portion of the spring H as a deflector or mud-guard for ordinary purposes.

When my improvement is applied to a lady's wheel, a stem $s$ is attached to the front portion of the saddle-post. This stem is provided with a loop $s'$, through which the adjusting-strap P passes.

T is an adjustable segmental mud spoon or deflector removably attached to the inner lower side of the spring H by clamps $t$ and a thumb-screw $t'$. When the roads are unusually muddy or slushy and the spring has not sufficient surface to deflect the mud, the spoon T is detached from the inner side of the spring H and attached to the rear side thereof, as shown in dotted lines in Fig. 1. The thumb-screw $t'$ serves to hold the spoon in any desired position.

The clamps $t$ are preferably stamped in one piece with the mud-guard T and are provided with longitudinal depressions $t^2$, which snugly embrace the sides of the spring H and hold the mud-guard in any desired position.

The mud-guard T can be adjusted, as shown in dotted lines at $r$, so as to form a forward and upward continuation of the loop R of the spring H when used as a luggage-carrier.

In the modified construction of the yoke L shown in Fig. 7 the yoke L and clips $n$ $n$ are provided with transversely-elongated openings or seats $s$, which embrace the rear forks E' of the bicycle-frame and permit the vertical adjustment of the yoke.

My improved saddle-support and mud-guard are simple, compact, durable, and light and greatly add to the appearance of the bicycle.

What I claim as new, and desire to secure by Letters Patent, is—

1. The combination with a bicycle-saddle spring H having a downwardly, rearwardly, upwardly and forwardly curved, circular or segmental portion R of flat cross-section, and provided at its free end with a saddle-stem $i$ of the cylindrical cross-section, of a yoke L whereby said spring is adjustably secured to the bicycle-frame, and a strap P connecting the bicycle-frame with the saddle-stem, and whereby the upward movement of the latter is limited, substantially as set forth.

2. The combination with a bicycle-saddle spring H having a downwardly, rearwardly, upwardly and forwardly curved, circular or segmental portion R of flat cross-section, a plate T of coincident curvature clamped inside thereof and adapted to be slid up and form practically an upward continuation of the lower forward and upward curved portion of the spring and thereby form a luggage-carrier and adapted to be reversed and clamped on the rear side of the loop R to form a mud-guard, and a yoke whereby said spring is attached to the bicycle-frame substantially as set forth.

JOHN S. VOLTZ.

Witnesses:
W. J. JAMISON,
EDWIN J. VOLTZ.